United States Patent [19]
Nakamichi

[11] Patent Number: 6,097,687
[45] Date of Patent: Aug. 1, 2000

[54] DISK TRANSFER DEVICE

[75] Inventor: Niro Nakamichi, Tokyo, Japan

[73] Assignee: Nakamichi Corporation, Japan

[21] Appl. No.: 09/066,250

[22] Filed: Apr. 24, 1998

[30] Foreign Application Priority Data

May 6, 1997 [JP] Japan ................................. 9-131675

[51] Int. Cl.[7] .................................................. G11B 17/04
[52] U.S. Cl. ........................................................ 369/75.2
[58] Field of Search ................................ 369/75.1, 75.2, 369/77.1

[56] References Cited

U.S. PATENT DOCUMENTS

| | | | |
|---|---|---|---|
| 4,682,320 | 7/1987 | d'Arc | 369/77.1 |
| 4,979,160 | 12/1990 | Araki | 369/75.2 |
| 5,136,570 | 8/1992 | Takai et al. | 369/77.1 |
| 5,255,255 | 10/1993 | Kaneda et al. | 369/77.1 |
| 5,561,658 | 10/1996 | Nakamichi et al. | 369/263 |
| 5,878,011 | 3/1999 | Nakamichi | 369/75.2 |

Primary Examiner—William Klimowicz
Attorney, Agent, or Firm—Morrison Law Firm

[57] ABSTRACT

A disk transfer device provides positive, reliable disk transfer. The device comprises a pair of moveable, opposed disk guide members which grip the outer edge of a disk disposed therebetween. A spring constantly urges the disk guide members closer together. A pinion gear connects the disk guide members and controls their movement together or apart. A bias device applies a torque to the pinion gear so as to urge the disk guide members together to increase the disk gripping force of the disk guide members during disk transfer.

11 Claims, 10 Drawing Sheets

DISK TRANSFER DEVICE

BACKGROUND OF THE INVENTION

The present invention relates to a disk transfer device and, more particularly, to a disk transfer device which grips the outer edge of a disk during the disk transfer.

Japanese patent application SN 7-72281 (Japanese Laid-Open Publication Number 8-241552), discloses a disk transfer device which transfers a disk by gripping its outer edge. The disk transfer device described in this publication comprises: a driven disk guide which guides a first edge of a disk in the disk transfer direction and which has an internal driven belt which drives this disk edge; a fixed disk guide which guides a second disk edge in the disk transfer direction and which is equipped with a friction sheet which prevents slippage between it and this disk edge; and springs which draw the disk guides closer together. With this disk transfer device, a disk is gripped between the disk guides and is transferred to the playback position by driving one edge of the disk with a drive belt.

In the disk transfer device described above, the spring force of the springs connecting the disk guides must be strong, if the disk is to be securely gripped during the transfer. Such a grip is necessary to insure positive disk transfer regardless of external vibrations or the vertical orientation of the device. However, because disk insertion necessitates pushing apart the disk guides, if the spring force is too strong, there is a large amount of resistance to disk insertion. This problem is particularly acute in a disk transfer device which is capable of transferring both large disks of 120 mm diameter and small size disks (called single CDs) of 80 mm diameter. To make the transfer of small size disks possible, the initial spacing of the disk guides must be made narrower than the diameter of these disks. As a result, the spacing is too narrow for insertion of a large size disk, and an extremely large amount of insertion force is required. On the other hand, if the spring force is set for a large size disk, the disk gripping force becomes extremely weak when transferring a small size disk because the spring is insufficiently stretched. In such circumstances, the disk may be insecurely gripped and transfer may be unreliable.

OBJECT AND SUMMARY OF THE INVENTION

The object of the present invention is to overcome the problems described above and to provide a disk transfer device capable of securely and positively transferring both large and small disks, despite vibrations or vertical orientation of the device. This is accomplished by providing disk transfer device wherein a bias means increases the disk gripping force of the disk guide members during disk transfer, thereby insuring the positive, reliable transfer of the disk.

According to an aspect of the invention, a disk transfer device comprises a loading chassis; a pair of linear disk guide members, moveably carried on the chassis, adapted to engage the edges of a disk disposed therebetween and to displace the disk along a predetermined path; a spring constantly urging the disk guide members together; and means for additionally urging the disk guide members together while a disk is being displaced along the path.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
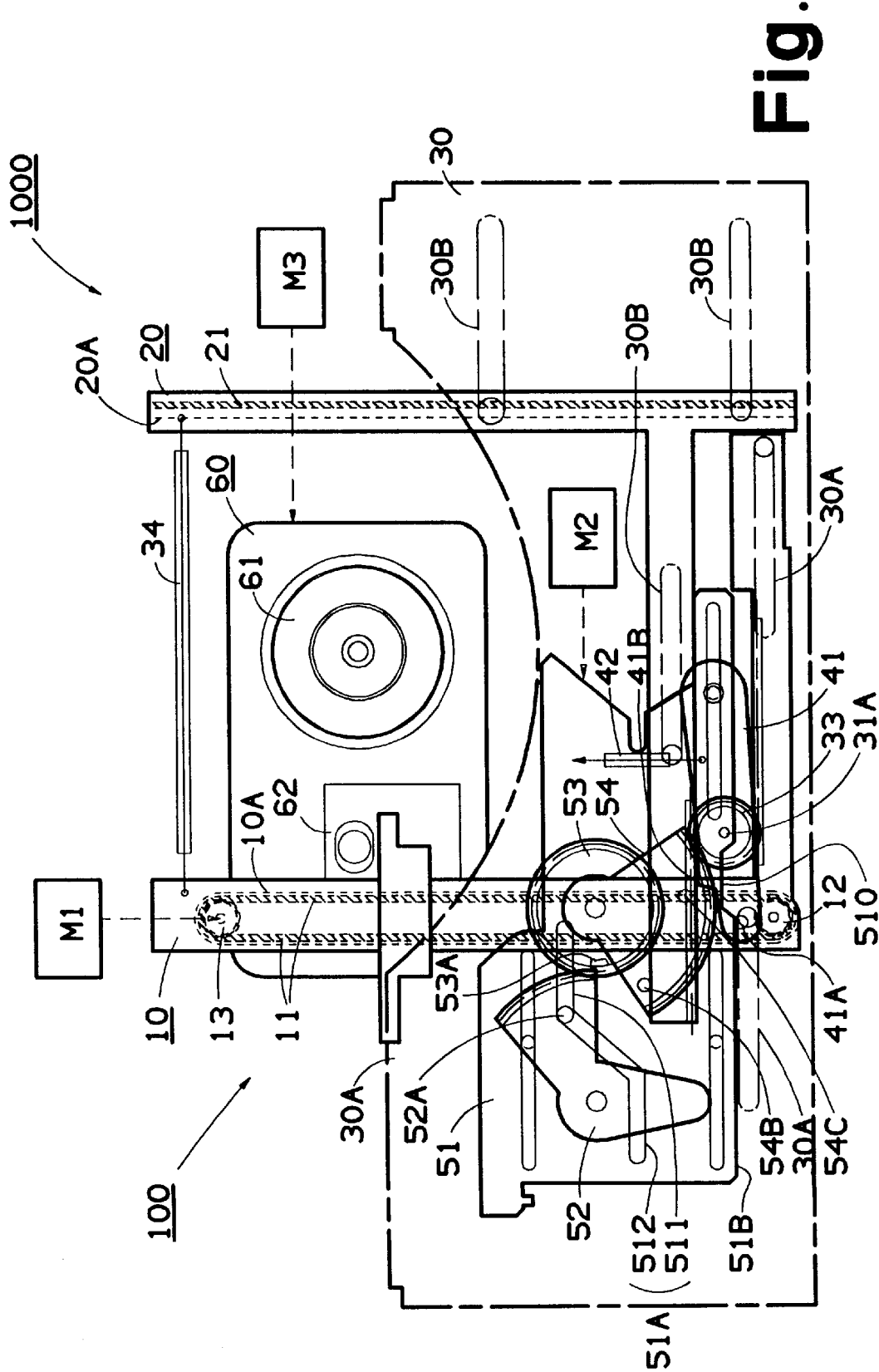
FIG. 1 is a schematic top view of a disk playback device incorporating a disk transfer mechanism in accord with the present invention. The figure shows the disk transfer device in a standby position.

Referring to FIG. 1, there is shown a disk playback device 1000 in standby mode. A disk transfer device 100 includes a driven disk guide 10 on the left side of the device and a fixed disk guide 20 on the right side of the device. A driven disk guide 10 has a guide groove 10A which guides the left edge of a disk in the disk transfer direction. Inside guide groove 10A, there is disposed a belt 11 which drives the left outer edge of the disk. Belt 11 is reeved between pulleys 12, 13 which are placed in front and back of driven disk guide 10. Pulley 13 is connected to a driving mechanism M1. A fixed disk guide 20 is equipped with a guide groove 20A which receives and guides the right disk edge. A friction sheet 21 is fixed inside guide groove 20A to prevent disk slippage.

Both disk guides 10, 20 are movably carried by a loading chassis 30, whereon their movement is guided by guides 30A and 30B one of which is created by the edge of loading chassis 30. Disk guides 10, 20 are guided in parallel movement between an initial position (FIG. 1) in which the spacing between driven belt 11 and friction sheet 21 is narrower than the diameter (80 mm) of small size disk D2 and a receiving position (FIG. 3) in which the distance between driven belt 11 and friction sheet 21 can be expanded to a value wider than the diameter (120 mm) of large size disk D1. Both disk guides 10, 20 are connected by a pinion gear 33 which is supported by pin 31A on loading chassis 30. Disk guides 10, 20 are urged together by a weak force from a spring 34. Because the resistance to disk insertion is determined by the spring force of spring 34, this force is set as weak as possible.

Figure 3:
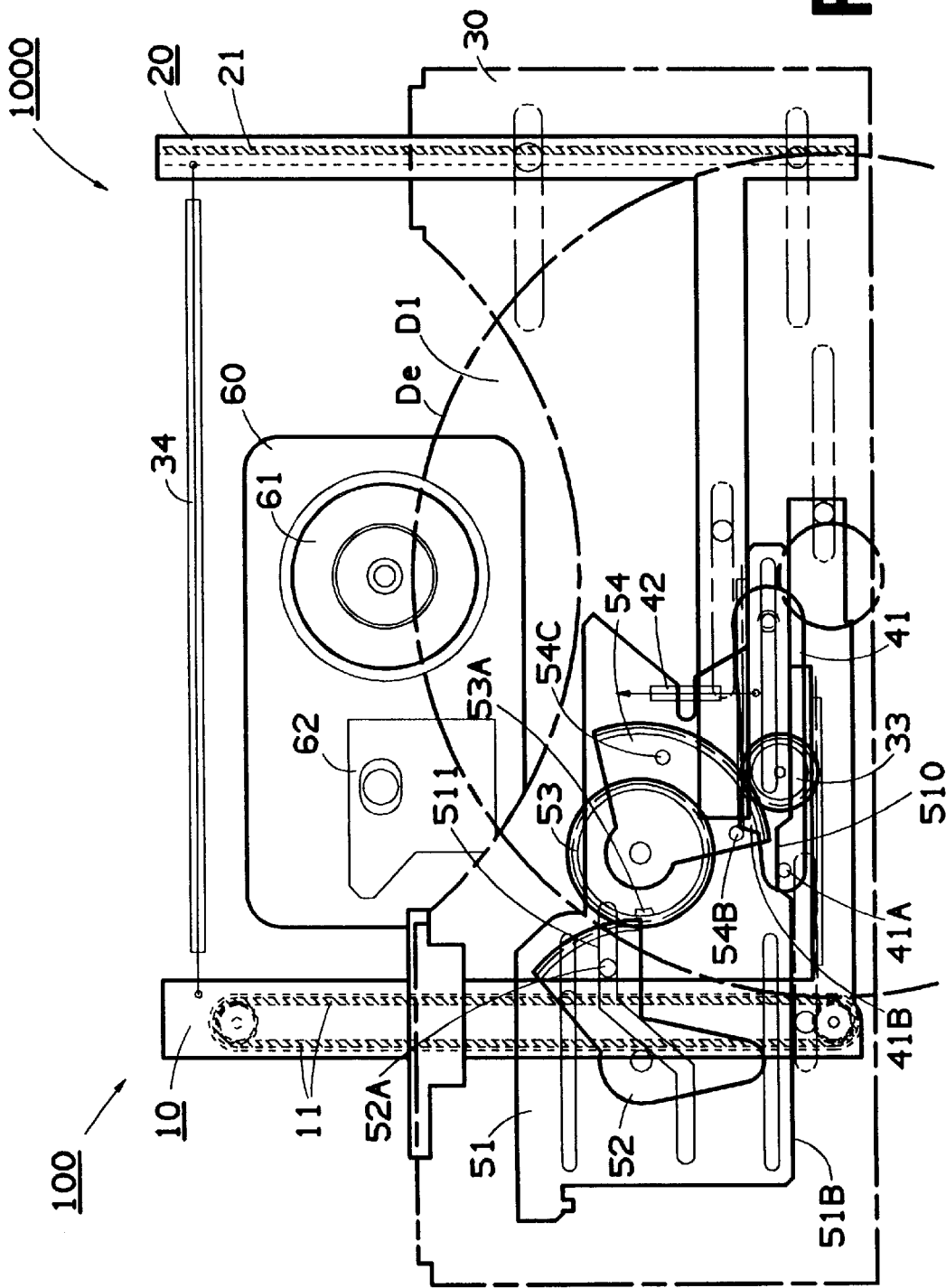
FIG. 3 is a schematic top view of the disk playback device of FIGS. 1 and 2 showing a large size disk being transferred.
Figure 5:
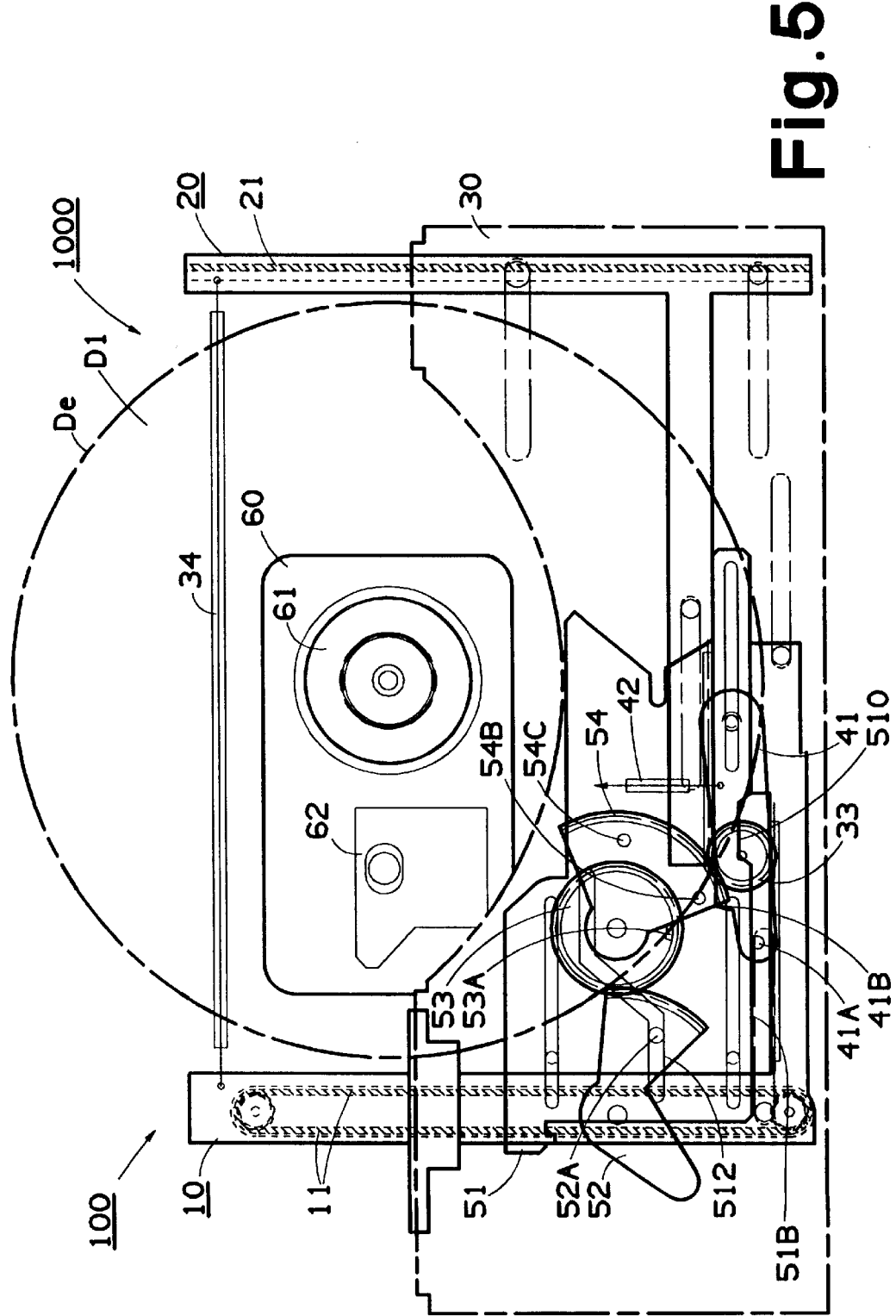
FIG. 5 is a schematic top view of the disk playback device of FIGS. 1–4 showing a large size disk during playback.
Figure 6:
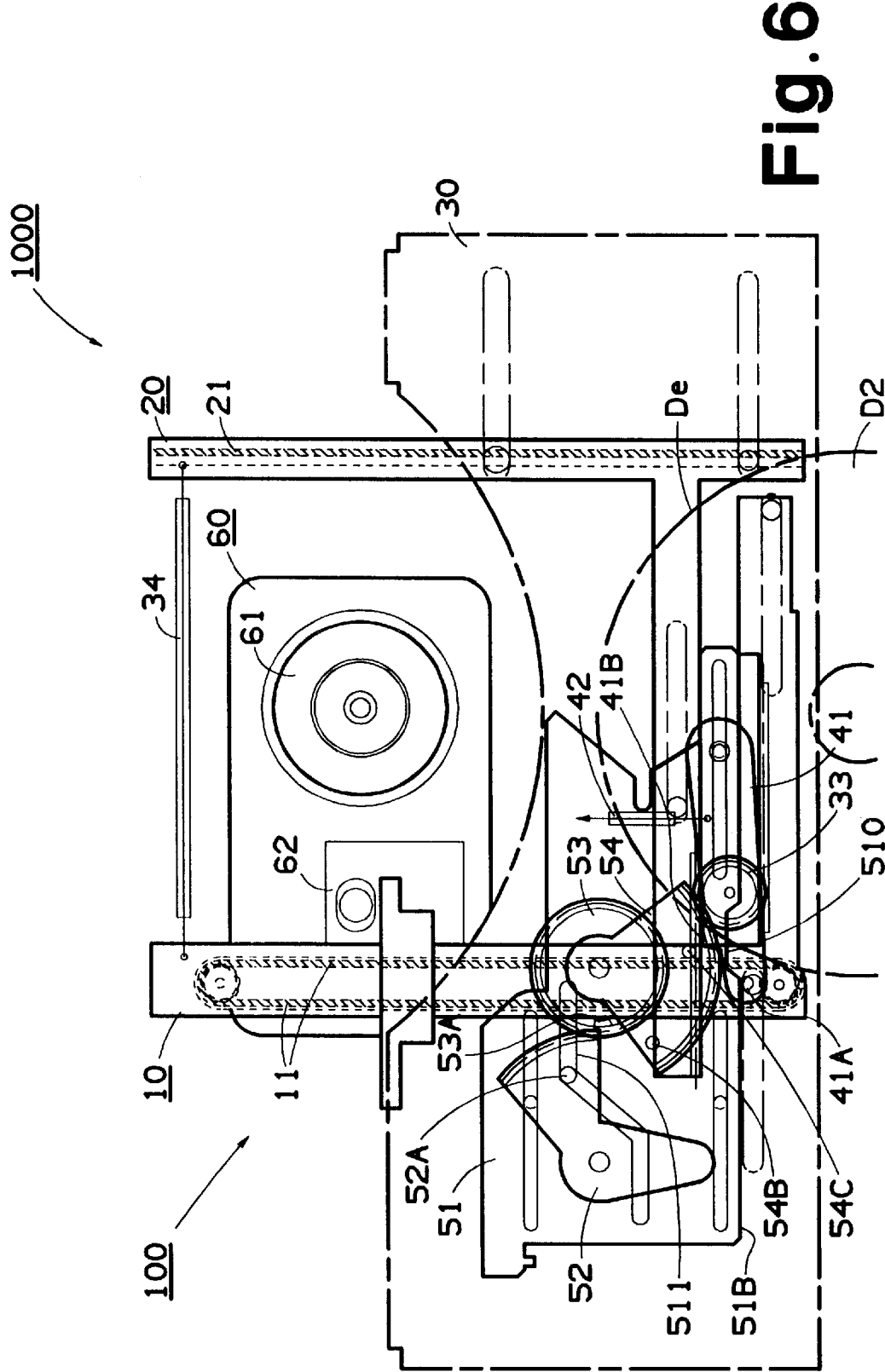
FIG. 6 is a schematic top view of the disk playback device of FIGS. 1–5 showing the insertion of a small size disk.
Figure 10:
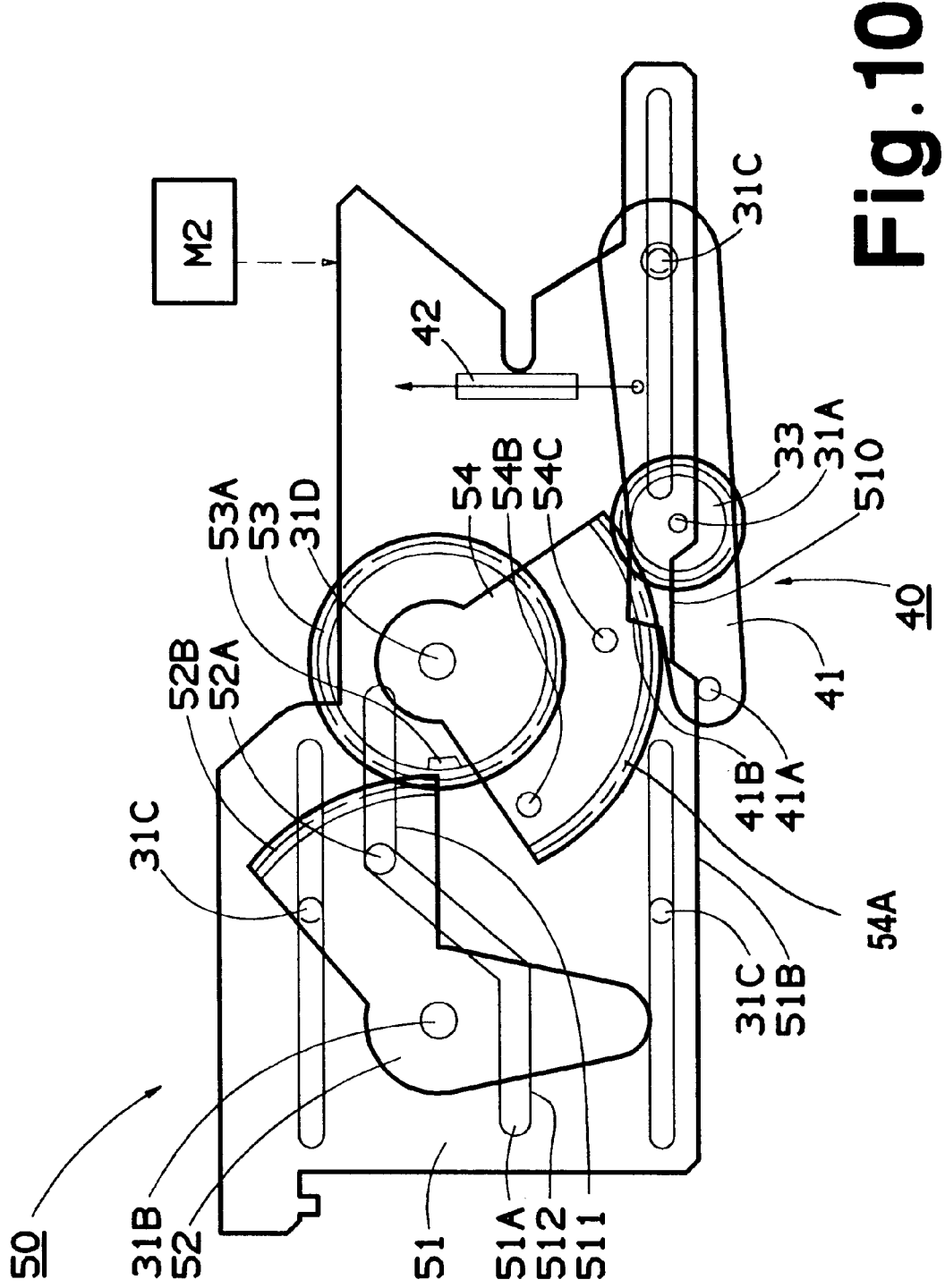
FIG. 10 is an enlarged top view showing the details of the opening and closing mechanism and the bias means.

Disk guides 10, 20 are moved between the initial position and the receiving position as described above by a closing and opening mechanism 50 which comprises a loading plate 51, a loading cam 52, a loading gear 53, an idle gear 54, and a driving mechanism M2 (see FIG. 10). Loading plate 51 is guided by three pins 31C on loading chassis 30. Loading plate 51 is driven, by driving mechanism M2, between three positions: the standby position as shown in FIG. 1 and FIG. 10, the loading position as shown in FIG. 3, and the playback position as shown in FIG. 5.

Loading plate 51 has a cam groove 51A. The angle of loading cam 52 is controlled by the position of loading plate 51. Loading cam 52 is supported by pin 31B on loading chassis 30. Pin 52A follows cam groove 51A. A gear 52B, on the outer edge of loading cam 52, meshes with loading gear 53 which is supported by a pin 31D on loading chassis 30. Loading gear 53 has a projection 53A which may abut idle gear 54. Idle gear 54 is supported by pin 31D. A gear 54A, on the outer edge of idle gear 54, meshes with a pinion gear 33.

When loading plate 51 is in the standby position (FIG. 1) or a loading position (FIG. 3), pin 52A of loading cam 52 is in a horizontal area 511 of cam groove 51A and projection 53A of loading gear 53 is spaced apart from the side surface of idle gear 54. When loading plate 51 moves to the playback position FIG. 5), pin 52A of loading cam 52 enters horizontal area 512 of cam groove 51A, and loading cam 52 rotates in the clockwise direction. This causes loading gear 53 to rotate in the counterclockwise direction. Idle gear 54 is rotated in the counter clockwise direction by projection 53A. As a result, pinion gear 33 rotates in the clockwise direction and disk guides 10, 20 are thereby brought to the receiving position.

In order to insure positive disk transfer, disk transfer device 100 includes a bias means 40 which can increase the disk gripping force of disk guides 10, 20 (see FIG. 10). Bias means 40 comprises an additional spring (a coil spring 42) and a control means (a bias arm 41 and loading plate 51) which controls whether or not an additional force force is applied to disk guides 10, 20 by this spring. Bias arm 41 is rotatably supported on loading chassis 30 by a pin 31C. Bias arm 41 is urged in the clockwise direction by spring 42. On the tip of bias arm 41, a pin 41A abuts side 51B of loading plate 51A cam surface 41B, on bias arm 41, is capable of engagement with either of pins 54B, 54C on the upper surface of idle gear 54.

Figure 7:
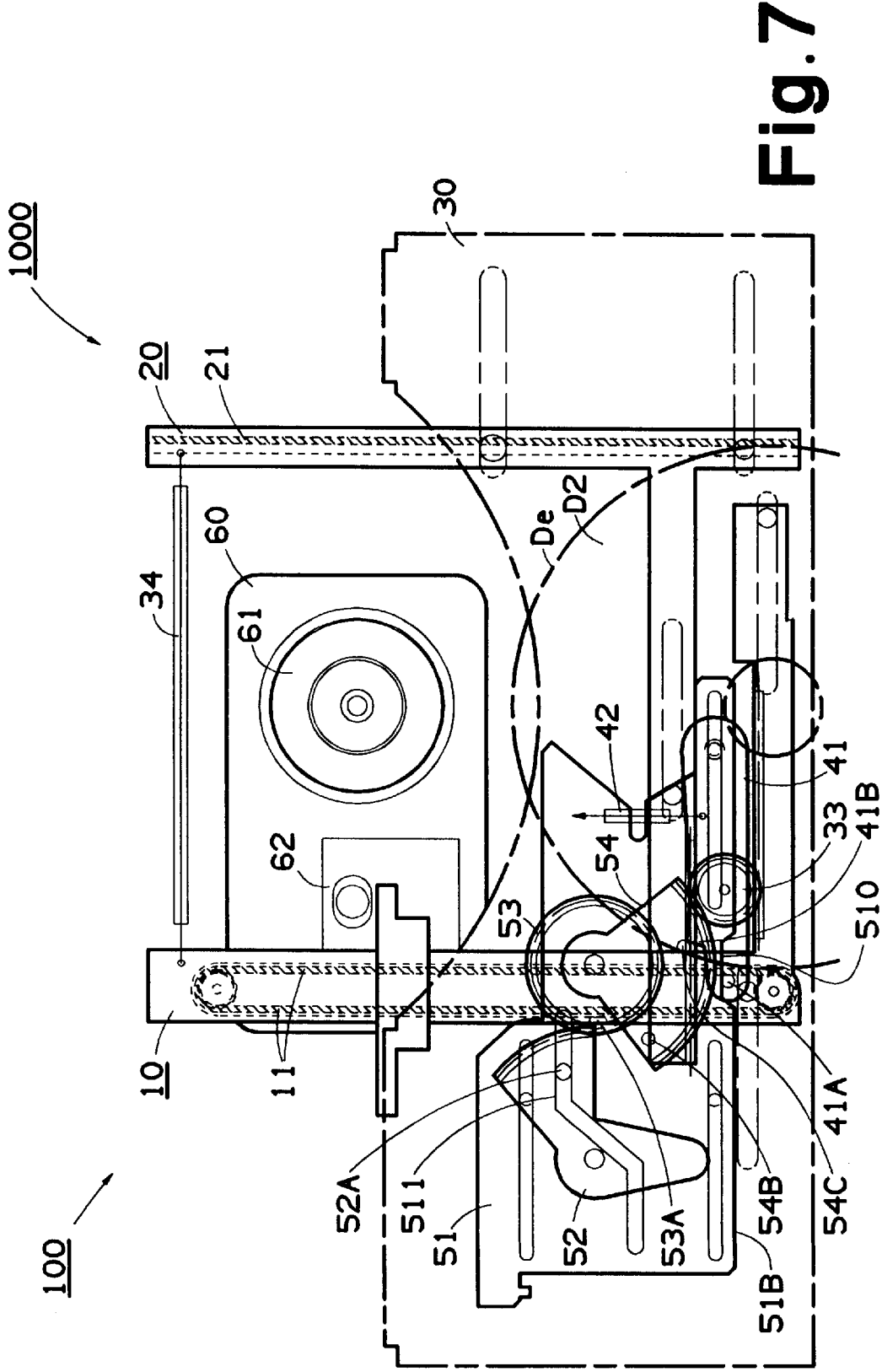
FIG. 7 is a schematic top view of the disk playback device of FIGS. 1–6 showing a small size disk being transferred.
Figure 8:
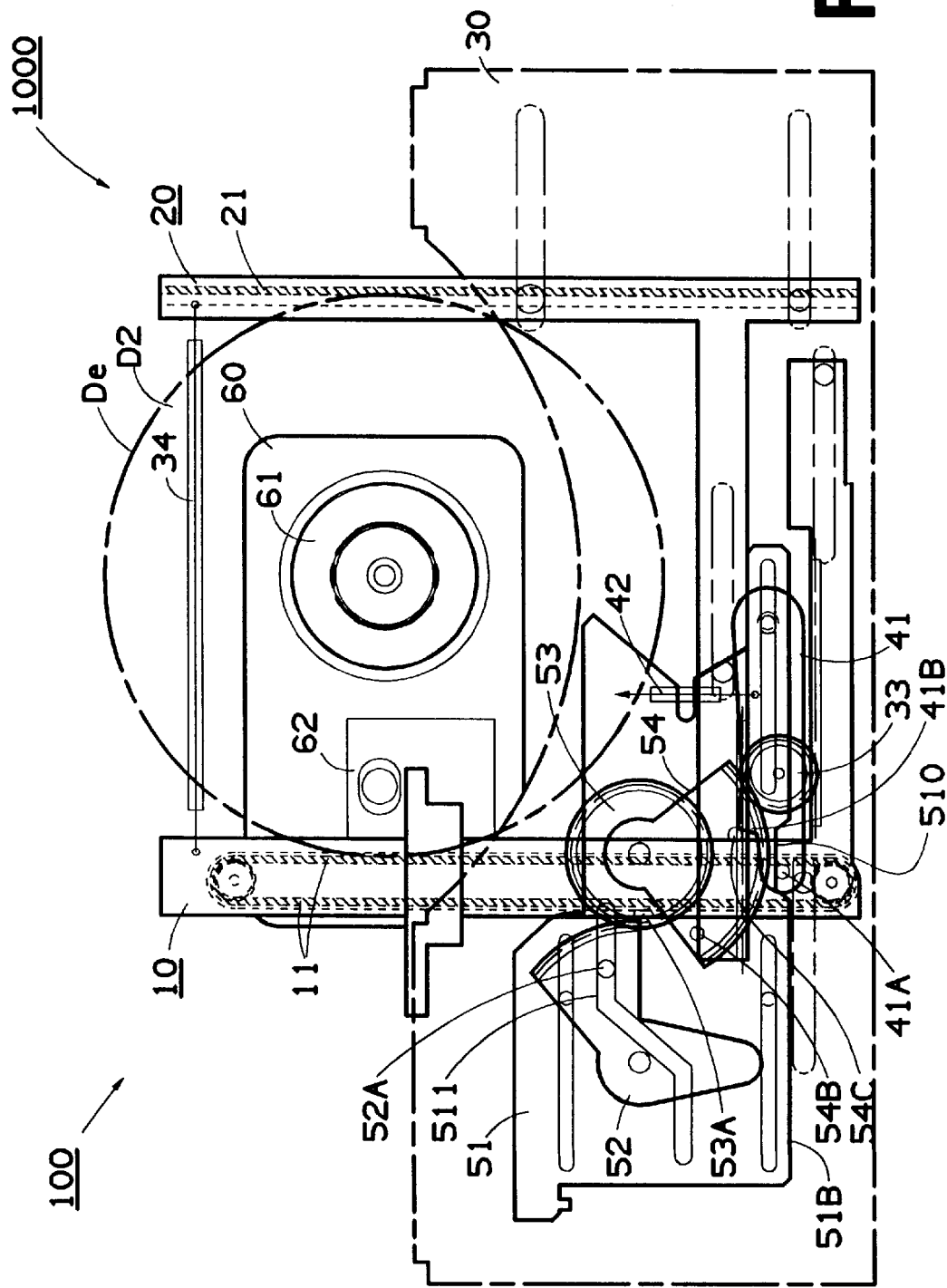
FIG. 8 is a schematic top view of the disk playback device of FIGS. 1–7 showing a small size disk being brought to the playback position.
Figure 9:
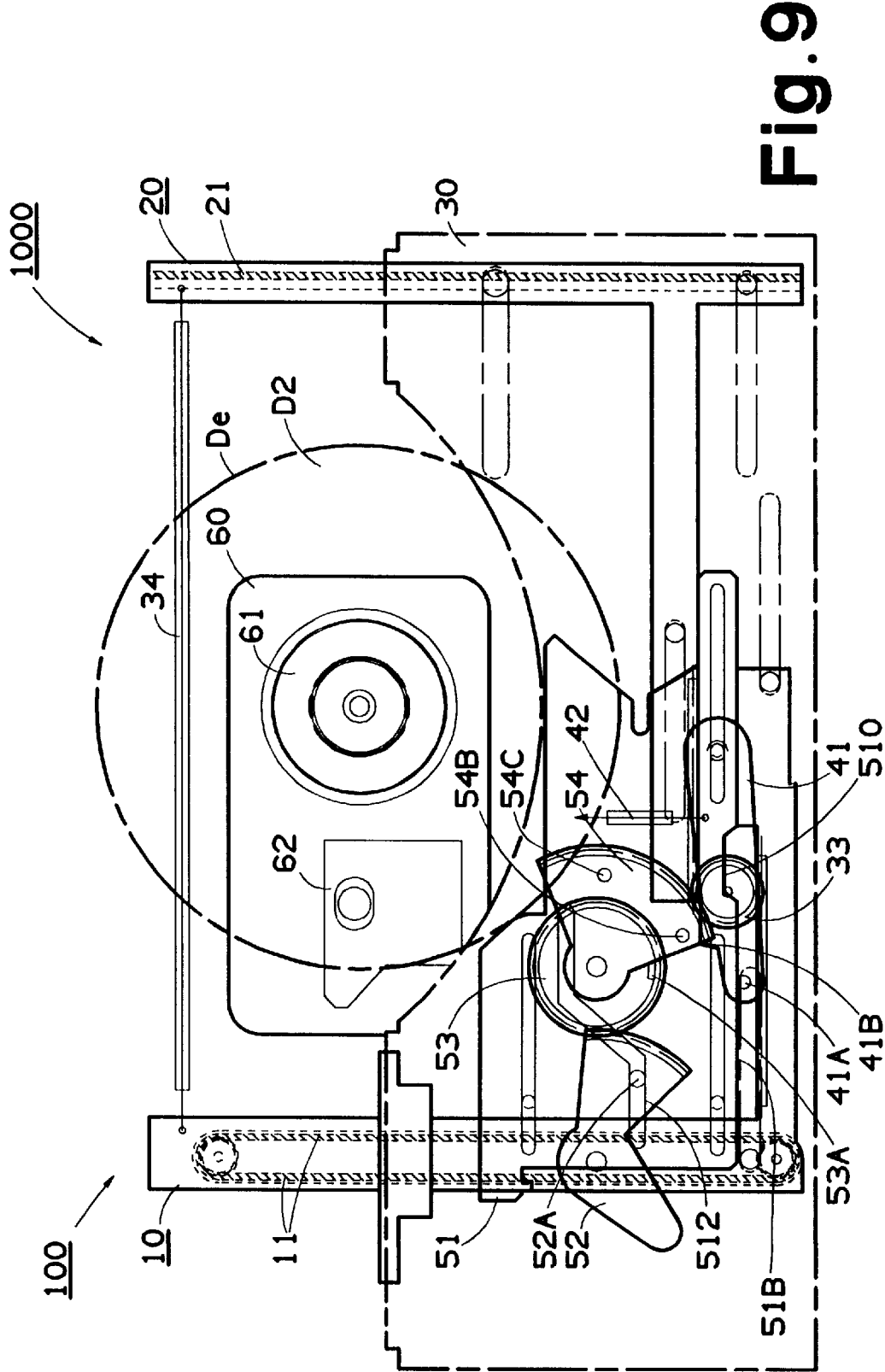
FIG. 9 is a schematic top view of the disk playback device of FIGS. 1–8 showing a small size disk during playback.

When loading plate 51 is brought to the loading position (FIG. 3), the spring force of spring 42 is applied to disk guides 10, 20. With loading plate 51 in this position, pin 41A is opposite concave area 510 on surface 51B of loading plate 51 and bias arm 41 is permitted to pivot clockwise. When the disk to be transferred is a large size disk D1, idle gear 54 is at the angle shown in FIG. 3. Bias arm 41, acting through cam surface 41B, urges pin 54B to the left and, as a result, idle gear 54 is urged in the clockwise direction by spring 42. This force is ultimately applied to disk guides 10, 20 via pinion gear 33, thus increasing the disk gripping force. On the other hand, if the disk to be transferred is small size disk D2, idle gear 54 is at the angular position shown in FIG. 7. Bias arm 41, acting through cam surface 41B, urges pin 54C to the left and idle gear 54 is thereby urged in the clockwise direction.

When loading plate 51 is in the standby position (FIG. 1) or the playback position (FIG. 5), bias arm 41 abuts surface 51B of loading plate 51, and its clockwise rotation is prevented. As a result, cam surface 41B is outside of the transfer pathway of pins 54B, 54C. The force of spring 42 is not applied to idle gear 54 or, ultimately, to disk guides 10, 20.

An optical mechanism 60, comprising a turntable 61 and an optical head 62, is moved beneath the disk which has been brought to the playback position. Optical mechanism 60 is driven by a driving mechanism M3 for movement in the vertical direction. Optical mechanism 60 moves between an elevated or disk-playing position and a retracted position where it is retracted below the disk. Above turntable 61, there is disposed a convenient clamping device (not shown) which is also capable of vertical movement. A disk mounted on turntable 61 is clamped and held in place by this device.

The operations of disk transfer device 100 will now be explained. While in the standby mode, i.e. when it is capable of accepting a disk, disk guides 10, 20 are retained in an initial position by the spring force of spring 34. In the initial position, the separation of disk guides 10, 20 is narrower than the diameter of a small-size disk. Loading plate 51 is in a standby position. As a result, pin 52A of loading cam 52 is positioned inside horizontal area 511 of cam groove 51A. Projection 53A of loading gear 53 is spaced slightly apart from the surface of idle gear 54. Pin 41A of bias arm 41 is constrained by surface 51B of loading plate 51. Cam surface 41B is retracted outside of the movement pathway of pins 54B, 54C of idle gear 54.

Figure 2:
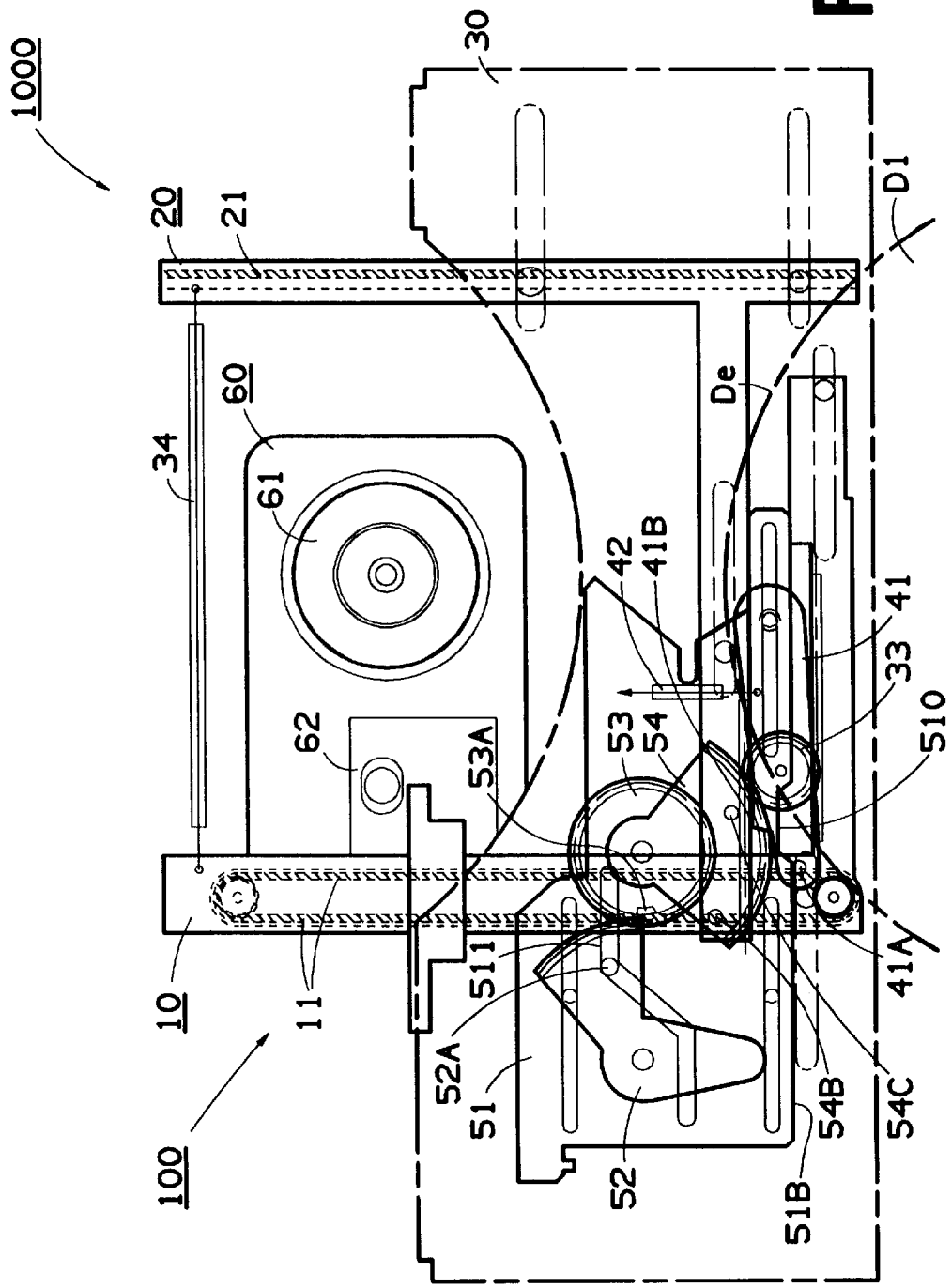
FIG. 2 is a schematic top view of the disk playback device of FIG. 1 showing the insertion of a large size disk.

When a large size disk D1 is inserted (FIG. 2), its outer edge De pushes against disk guides 10, 20, which are pushed open against the spring force of coil spring 34. With this movement, pinion gear 33 rotates in the clockwise direction. Idle gear 54 rotates in the counter clockwise direction. The drive of belt 11 is activated to impart a driving force on the left outer edge of disk D1.

When disk D1 is brought to a position where it is gripped on either side of its center (FIG. 3), loading plate 51 moves to the left and is brought to the loading position. Pin 41A of bias arm 41 is opposite concave area 510 of cam surface 51B allowing bias arm 41 to pivot in the clockwise direction under the urging of spring 42. Bias arm 41 pushes the right side of pin 54B against cam surface 41B. As a result, idle gear 54 is urged in the clockwise direction. This force is ultimately applied to disk guides 10, 20 via pinion gear 33. As a result, a spring force is applied to disk guides 10, 11 by spring 42 in addition to the usual spring force of spring 34. Disk D1 is thus securely gripped.

Figure 4:
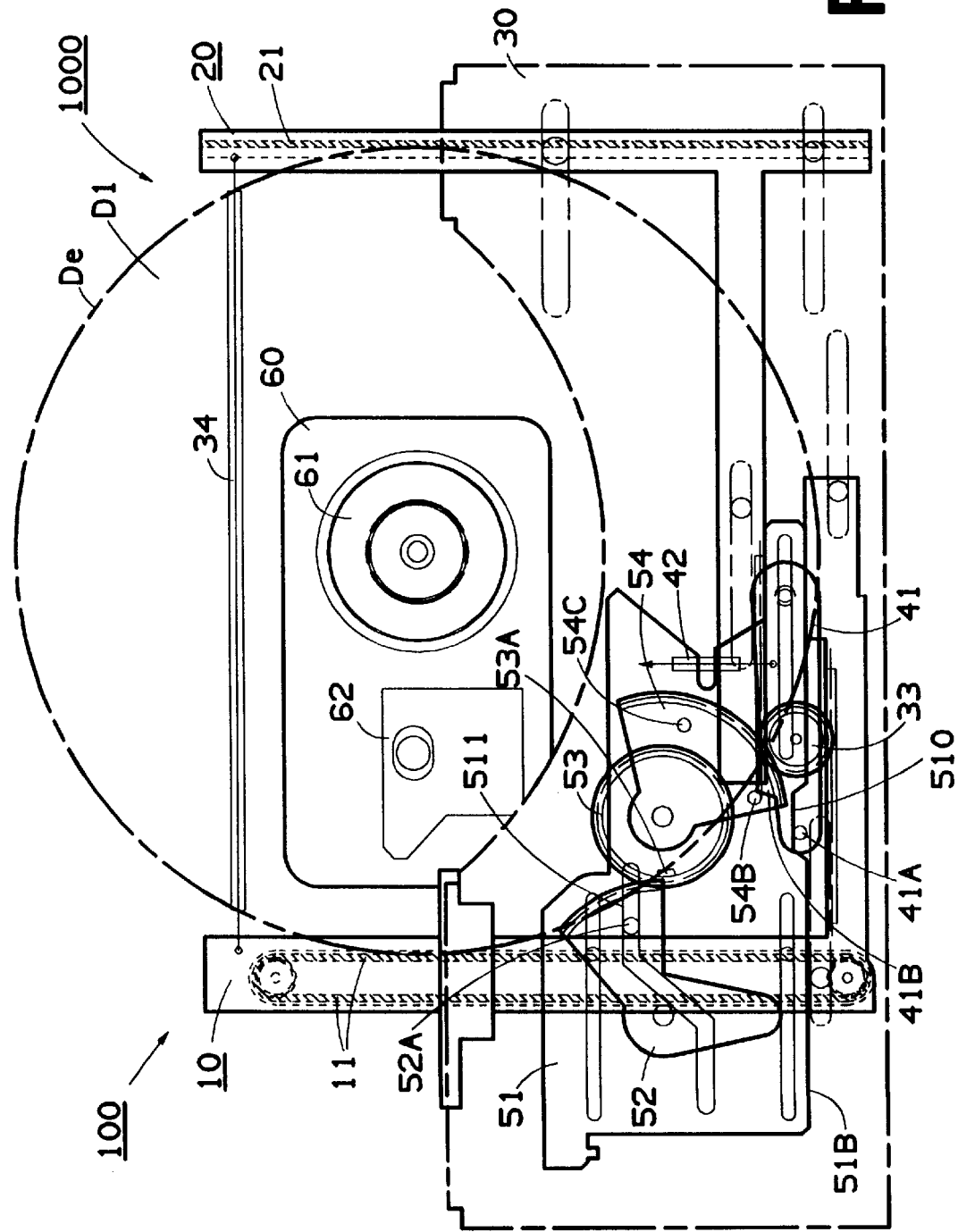
FIG. 4 is a schematic top view of the disk playback device of FIGS. 1–3 showing a large size disk being brought to the playback position.

After disk D1 is transferred to the playback position (FIG. 4), driving of belt 11 is terminated. Turntable 60 and optical head 61 are raised. In addition, the gripping device (not shown) is lowered to the upper surface of disk D, clamping it to the top of turntable 60. Next, loading plate 51 is moved to the right and brought to the playback position (FIG. 5). Movement of pin 41A of bias arm 41 is thus prevented by the surface 51B. Cam surface 41B is outside of the movement path of pin 54B, 54C of idle gear 54. As a result, the spring force of spring 42 which was applied to disk guides 10, 20 disappears. Furthermore, pin 52A of loading cam 52 enters horizontal area 512 of cam groove 51A. Loading gear 53 rotates in the counter-clockwise direction, causing idle gear 54 to rotate in the same direction. As a result, pinion gear 33 rotates in the clockwise direction. Disk guides 10, 20 spread apart to the receiving position. Belt 11 and friction sheet 21 separate from the outer edge of the disk. Disk D1 is rotated at a set linear speed to read the recorded information of the disk by optical head 61.

The operation of disk transfer device 100, from disk insertion to playback, were explained above. The operation from playback of the disk to ejection of the disk from the device is simply the operation described above conducted in reverse. As a result, the description thereof will be abbreviated. FIGS. 6–9, illustrate the actions from insertion of a small size disk D2 until it is played back. These figures correspond to FIGS. 2–5 described above. In transferring small size disk D2, idle gear 54 is only slightly rotated at the time of disk transfer. As a result, during disk transfer, cam surface 41B of bias arm 41 pushes pin 54C of idle gear 54. The disk gripping force is increased. The remaining operation is the same as that described above, whereby no further description is necessary.

Having described preferred embodiment of the invention with reference to the accompanying drawings, it is to be understood that the invention is not limited to the precise embodiment described, and that various changes and modifications may be effected therein by one skilled in the art without departing from the scope or spirit of the invention as defined in the appended claims.

For example, in the embodiment described above, spring 34 is placed between disk guides 10, 20. However, since both disk guides are connected by pinion gear 33, it is possible to place spring 34 between one disk guide and loading chassis 30. It is also possible to urge idle gear 54 in the clockwise direction.

Furthermore, spring 34 which draws together disk guides 10, 20 can be stretched further during disk transfer, whereby the disk gripping force is increased. For example, spring 34 can be placed between either of disk guides 10, 20 and a moveable control member. During disk transfer, spring 34 is stretched by the control member, and the disk gripping force is thereby increased.

Also, both the left and right outer edges of the disk can be driven so that the disk is transferred without rotation. The present invention can be applied to various disk transfer devices. While it has been described with reference to a device adapted to transfer both large size and small size disks, it can also be applied to disk transfer devices which transfer only one or the other size disk.

By the present invention, disk gripping power is increased during disk transfer. Even if the device is used in a vertical orientation or is subject to external vibrations, there is positive, reliable transfer of the disk. Further the insertion resistance is minimized and a smooth disk insertion is achieved.

What is claimed is:

1. A disk transfer device, comprising:

a loading chassis;

a pair of linear disk guide members carried on said chassis, movable toward and away from each other, said disk guide members being adapted to engage edge portions of a disk disposed therebetween and to displace said disk along a predetermined path;

a spring constantly urging said disk guide members together;

urging means for additionally urging said disk guide members together while said disk is being displaced along said path; and control means for controlling an amount of additional force said urging means applies to said disk guide members.

2. A disk transfer device as described in claim 1, further comprising a pinion gear engaging both of said disk guide members such that rotation of said pinion gear draws said disk guide members together or away from each other.

3. A disk transfer device, comprising:

a loading chassis;

a pair of linear disk guide members carried on said chassis, movable toward and away from each other, said disk guide members being adapted to engage edge portions of a disk disposed therebetween and to displace said disk along a predetermined path;

a spring constantly urging said disk guide members together;

urging means for additionally urging said disk guide members together while said disk is being displaced along said path;

a pinion gear engaging both of said disk guide members such that rotation of said pinion gear draws said disk guide members together or away from each other; and said urging means including spring means for controllably applying a torque to said pinion gear.

4. A disk transfer device as described in claim 3, further comprising a loading plate slidably carried by said loading chassis, application of said torque by said spring means being controlled by the position of said loading plate on said loading chassis.

5. A disk transfer device, comprising:

a loading chassis;

a pair of linear disk guide members carried on said chassis, movable toward and away from each other, said disk guide members being adapted to engage edge portions of a disk disposed therebetween and to displace said disk along a predetermined path;

a spring constantly urging said disk guide members together;

urging means for additionally urging said disk guide members together while a disk is being brought to a position whereat it is engaged by said disk guide members at diametrically opposed edge portions; and control means for controlling an amount of additional force said urging means applies to said disk guide members.

6. A disk transfer device, comprising:

a loading chassis;

transfer means, carried on said chassis, for gripping edge portions of a disk, with a predetermined grip intensity, and for displacing said disk along a predetermined path; and urging means for increasing said grip intensity when said disk is being transferred by said transfer means; and control means for controlling an amount of additional force said urging means applies to increase said grip intensity.

7. A disk transfer device as described in claim 5, further comprising a pinion gear engaging both of said disk guide members such that rotation of said pinion gear draws said disk guide members together or away from each other.

8. A disk transfer device, comprising:

a loading chassis;

a pair of linear disk guide members carried on said chassis, movable toward and away from each other, said disk guide members being adapted to engage edge portions of a disk disposed therebetween and to displace said disk along a predetermined path;

a spring constantly urging said disk guide members together;

urging means for additionally urging said disk guide members together while a disk is being brought to a position whereat it is engaged by said disk guide members at diametrically opposed edge portions;

a pinion gear engaging both of said disk guide members such that rotation of said pinion gear draws said disk guide members together or away from each other; and said urging means comprises spring means for controllably applying a torque to said pinion gear.

9. A disk transfer device as described in claim 8, further comprising a loading plate slidably carried by said loading chassis, application of said torque by said spring means being controlled by the position of said loading plate on said loading chassis.

10. A disk transfer device, comprising:

a loading chassis;

a pair of linear disk guide members carried on said chassis, movable toward and away from each other, said disk guide members being adapted to engage edge portions of a disk disposed therebetween and to displace said disk along a predetermined path;

a spring constantly urging said disk guide members together;

urging means for additionally urging said disk guide members together while said disk is being displaced along said path; and at least one of said disk guide members comprises a drive belt and means for driving said drive belt.

11. A disk transfer device, comprising:

a loading chassis;

a pair of linear disk guide members carried on said chassis, movable toward and away from each other, said disk guide members being adapted to engage edge portions of a disk disposed therebetween and to displace said disk along a predetermined path;

a spring constantly urging said disk guide members together;

urging means for additionally urging said disk guide members together while a disk is being brought to a position whereat it is engaged by said disk guide members at diametrically opposed edge portions; and at least one of said disk guide members comprises a drive belt and means for driving said drive belt.

* * * * *